(12) United States Patent
Yamamoto

(10) Patent No.: US 10,836,007 B2
(45) Date of Patent: Nov. 17, 2020

(54) COOLANT SUPPLY DEVICE

(71) Applicant: DMG MORI CO., LTD., Nara (JP)

(72) Inventor: Kosuke Yamamoto, Nara (JP)

(73) Assignee: DMG MORI CO., LTD., Nara (JP)

( * ) Notice: Subject to any disclaimer, the term of this patent is extended or adjusted under 35 U.S.C. 154(b) by 251 days.

(21) Appl. No.: 16/028,760

(22) Filed: Jul. 6, 2018

(65) Prior Publication Data
US 2019/0022813 A1 Jan. 24, 2019

(30) Foreign Application Priority Data
Jul. 21, 2017 (JP) .................................. 2017-141713

(51) Int. Cl.
 *B23Q 11/10* (2006.01)
 *B23Q 11/00* (2006.01)
 *F04B 23/02* (2006.01)

(52) U.S. Cl.
 CPC .......... *B23Q 11/10* (2013.01); *B23Q 11/0075* (2013.01); *F04B 23/028* (2013.01)

(58) Field of Classification Search
 CPC . B23Q 11/0075; B23Q 11/08; B23Q 11/0825; B23Q 11/10; B23Q 11/1069; B23Q 11/12; B23Q 11/122; B01D 29/11; B01F 5/0243; F04B 23/028
 USPC ............................................ 165/104.31, 206
 See application file for complete search history.

(56) References Cited

U.S. PATENT DOCUMENTS

| 2,518,835 | A | * | 8/1950 | Summers | B01D 29/11 |
| | | | | | 210/254 |
| 3,170,352 | A | * | 2/1965 | Hensley | B23D 59/02 |
| | | | | | 83/168 |
| 3,539,009 | A | * | 11/1970 | Kudlaty | B01D 36/001 |
| | | | | | 210/90 |
| 5,135,364 | A | * | 8/1992 | McEwen | B01D 21/04 |
| | | | | | 417/360 |

(Continued)

FOREIGN PATENT DOCUMENTS

| EP | H11200085 A | | 7/1999 | |
| GB | 1063904 A | * | 4/1967 | ........... B23Q 11/143 |

(Continued)

OTHER PUBLICATIONS

Machine Translaiton of JP S49-83835, (Cited in Feb. 6, 2019 IDS), Retrieved May 10, 2020 (Year: 2020).*

(Continued)

*Primary Examiner* — Eric S Ruppert
*Assistant Examiner* — Hans R Weiland
(74) *Attorney, Agent, or Firm* — Miller, Matthias & Hull LLP

(57) ABSTRACT

A coolant supply device 1 includes a coolant tank 2 storing coolant therein, a mounting member 14 covering a part of an upper opening of the coolant tank 2, and supply pumps 32, 33, 34 mounted to the mounting member 14 and configured to pump up coolant C from the coolant tank 2 and supply the pumped-up coolant C to predetermined destinations. The coolant supply device 1 is configured such that the coolant C supplied to the predetermined destinations by the supply pumps 33, 34 is returned to the coolant tank 2. The mounting member 14 is supported by support members 16, 17, 18 such that it is slidable to a non-covered side of the upper opening of the coolant tank 2.

2 Claims, 4 Drawing Sheets

(56) References Cited

U.S. PATENT DOCUMENTS

| | | | | |
|---|---|---|---|---|
| 5,648,694 A | * | 7/1997 | Kobayashi | F04D 29/4266 |
| | | | | 310/87 |
| 6,355,167 B1 | * | 3/2002 | Wensauer | B01D 29/11 |
| | | | | 210/232 |
| 6,991,362 B1 | * | 1/2006 | Seaman | B01F 5/0218 |
| | | | | 366/168.2 |

FOREIGN PATENT DOCUMENTS

| | | |
|---|---|---|
| JP | S4983835 U | 7/1974 |
| JP | S5276139 U | 6/1977 |
| JP | H07-007855 | 2/1995 |
| JP | H077855 U | 2/1995 |

OTHER PUBLICATIONS

European Search Report related to Application No. EP 1818669.5 reported on Dec. 14, 2018.

\* cited by examiner

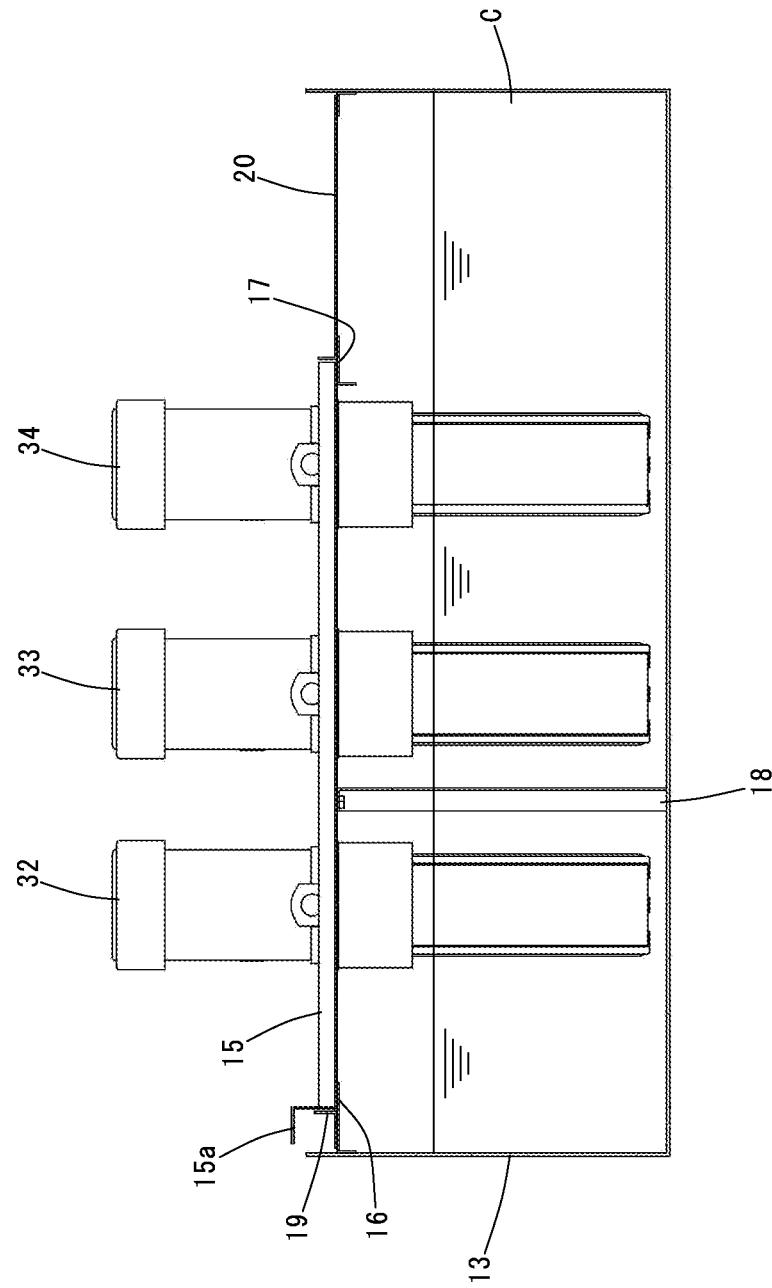

COOLANT SUPPLY DEVICE

BACKGROUND

Field of the Disclosure

This disclosure relates to a coolant supply device supplying coolant to a predetermined destination, such as a machining area of a machine tool or the like.

Background of the Disclosure

For example, in the case of a coolant supply device which supplies coolant into a machining area of a machine tool, foreign substances, such as chips and sludge, which are produced in the machining area are mixed in with the supplied coolant, and the coolant with which the foreign substances are mixed in is retuned to a coolant tank. The mixed foreign substances are accumulated in the coolant tank, and the coolant tank is defaced by the accumulated foreign substances. Accordingly, conventionally, on a regular basis, the machine tool and the coolant supply device are stopped, and, while they are in the stopped state, a supply pump, accompanying wires, and the like are removed and then the inside of the coolant tank is cleaned. However, such a maintenance operation requires a long time for removing the supply pump, the accompanying wires, and the like, which is a cause of decreased availability of the machine tool.

Accordingly, a coolant supply device which is intended to suppress such accumulation of foreign substances in a coolant tank has been proposed.

This coolant supply device is configured such that coolant discharged from a machining unit is filtered by a filter and then supplied again to the machining unit. The coolant supply device has a coolant tank having a rectangular shape in plan view and having four rounded corners, and includes vortex-flow producing means which pumps up coolant from the coolant tank and squirts the pumped-up coolant along a wall surface of the coolant tank, and circulating means which has an inlet port disposed near the center of the bottom of the coolant tank and returns coolant pumped up through the inlet port to the filter for filtering.

In this coolant supply device disclosed in Japanese Unexamined Utility Model Application Publication No. H07-7855, a vortex flow is produced in the coolant tank by the vortex-flow producing means to gather sludge deposited in the coolant tank to the center of the bottom of the coolant tank. The gathered sludge is pumped up by the circulating means, and the pumped-up sludge is returned to the filter, and filtered by the filter. In this way, accumulation of sludge in the coolant tank can be prevented.

SUMMARY OF THE DISCLOSURE

However, also in this conventional coolant supply device designed as described above, it is not possible to completely eliminate deposition of chips, sludge, and the like in the coolant tank. That is, even though sludge deposited in the coolant tank is gathered to the center of the bottom of the coolant tank by producing a vortex flow in the coolant tank with the vortex-flow producing means, because a flow of coolant in the coolant tank always has stagnation, it is not possible to completely avoid deposition of sludge and the like at an unexpected location. Further, in order to reliably pump up the sludge and the like gathered around the center of the bottom of the coolant tank, a pump having a very high pump-up ability is required. Accordingly, in practice, it is not possible to pump up all the gathered sludge; therefore, some of the sludge remains in the coolant tank.

As described above, ultimately, the conventional coolant supply device disclosed in Japanese Unexamined Utility Model Application Publication No. H07-7855 also requires regular cleaning (maintenance operation) of the coolant tank which is performed in a state where the supply pump, the accompanying wires, and the like are removed; therefore, the problem that performing such a maintenance operation decreases availability of the machine tool has not been solved.

In view of the foregoing, the present disclosure provides a coolant supply device which enables the inside of a coolant tank to be cleaned without removing a supply pump, accompanying wires, and the like.

According to certain aspects of the present disclosure, a coolant supply device includes:

a coolant tank storing coolant therein;

a mounting member covering a part of an upper opening of the coolant tank; and a supply pump mounted to the mounting member and configured to pump up the coolant stored in the coolant tank and supply the pumped-up coolant to a predetermined destination, the coolant supply device being configured such that the coolant supplied to the predetermined destination by the supply pump is returned to the coolant tank, the mounting member being supported by a support member such that it is slidable to a non-covered side of the upper opening of the coolant tank.

In this coolant supply device, coolant stored in the coolant tank is pumped up and supplied to a predetermined destination, for example, a machining area of a machine tool, by the supply pump, and the supplied coolant is returned to the coolant tank.

When cleaning the inside of the coolant tank, first, the inside of the coolant tank is cleaned through a non-covered part of the upper opening formed in the coolant tank. Subsequently, the mounting member is slid to the non-covered side to expose the opening covered by the mounting member, and the inside of the coolant tank is cleaned through the exposed opening.

Thus, in this coolant supply device, locations in the coolant tank which need to be cleaned can be cleaned without removing the supply pump, wires accompanying the supply pump, and the like. Therefore, the inside of the coolant tank can be cleaned in a shorter time than that required in the conventional coolant supply device.

Note that the coolant supply device according to the present disclosure may further include a lid body arranged to cover the upper opening of the coolant tank adjacently to the mounting member, the lid body being arranged such that it is attachable to and detachable from the coolant tank.

In the thus-configured coolant supply device, attaching the lid body to the coolant tank prevents foreign substances entering the coolant tank from above, and at the same time prevents the coolant in the coolant tank from flying out of the coolant tank.

When cleaning the inside of the coolant tank, first, the lid body is detached from the coolant tank to expose the opening, and the inside of the coolant tank is cleaned through the exposed opening. Subsequently, the mounting member is slid to the side previously covered by the lid body, to expose the opening covered by the mounting member, and the inside of the coolant tank is cleaned through the exposed opening.

Thus, also in the thus-configured coolant supply device, locations in the coolant tank which need to be cleaned can be cleaned without removing the supply pump, wires accompanying the supply pump, and the like. Therefore, the inside of the coolant tank can be cleaned in a shorter time than that required in the conventional coolant supply device.

Further, in each of the above-described coolant supply devices, a cable connected to the supply pump may be disposed along a sliding direction of the mounting member on one side end side of the mounting member, and the mounting member may have a cover portion provided thereon for covering the cable. This configuration enables the cable to be hidden by the cover portion, which allows the coolant supply device to have a better appearance.

As described above, in the coolant supply device according to the present disclosure, locations in the coolant tank which need to be cleaned can be cleaned without removing the supply pump, wires accompanying the supply pump, and the like, which enables the inside of the coolant tank to be cleaned in a shorter time than that required in the conventional coolant supply device.

BRIEF DESCRIPTION OF THE DRAWINGS

FIG. 4 is a sectional view taken along line A-A in FIG. 1.

DETAILED DESCRIPTION

Figure 1:
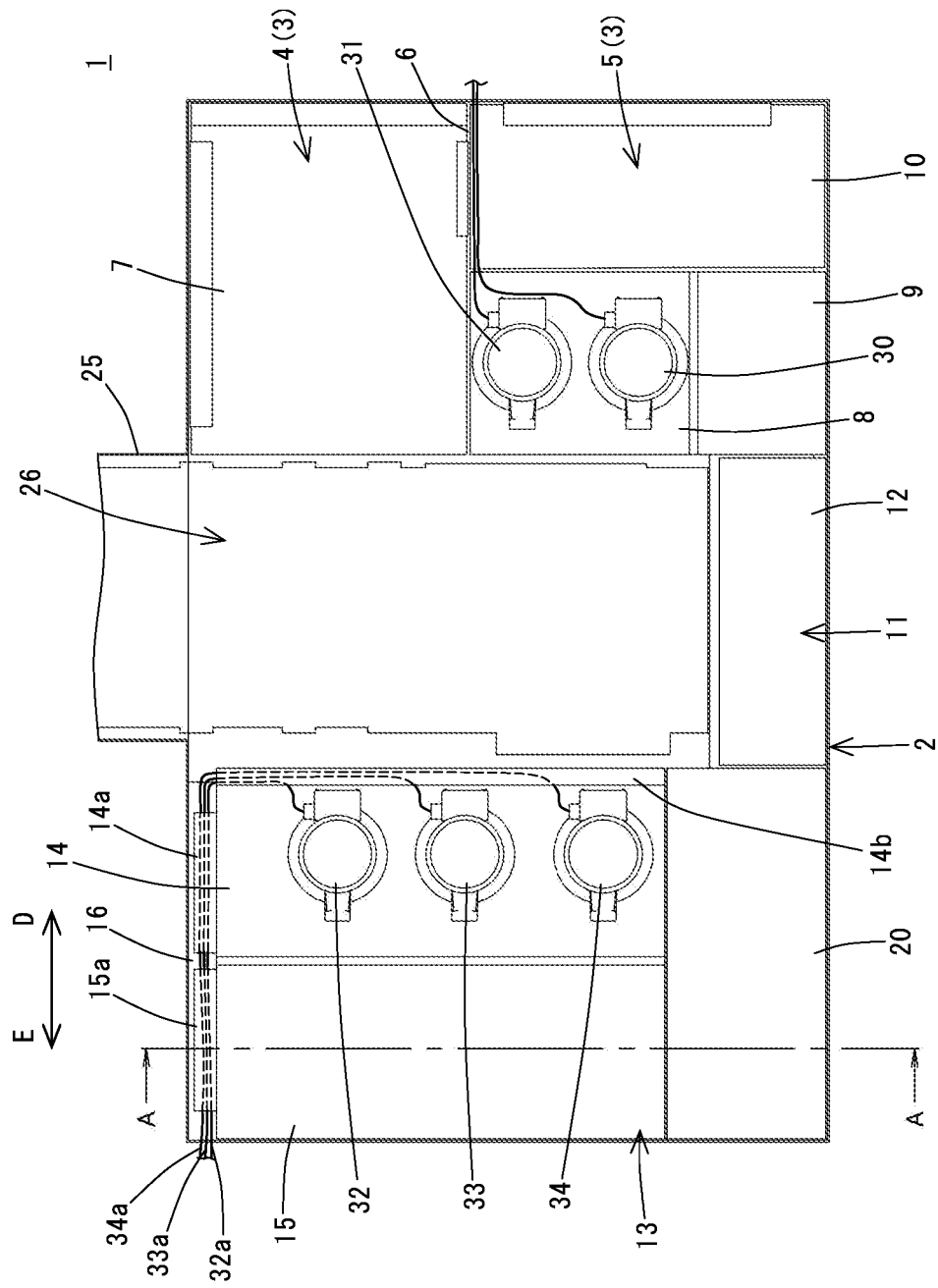
FIG. 1 is a plan view of a coolant supply device according to an embodiment of the present disclosure.
Figure 2:
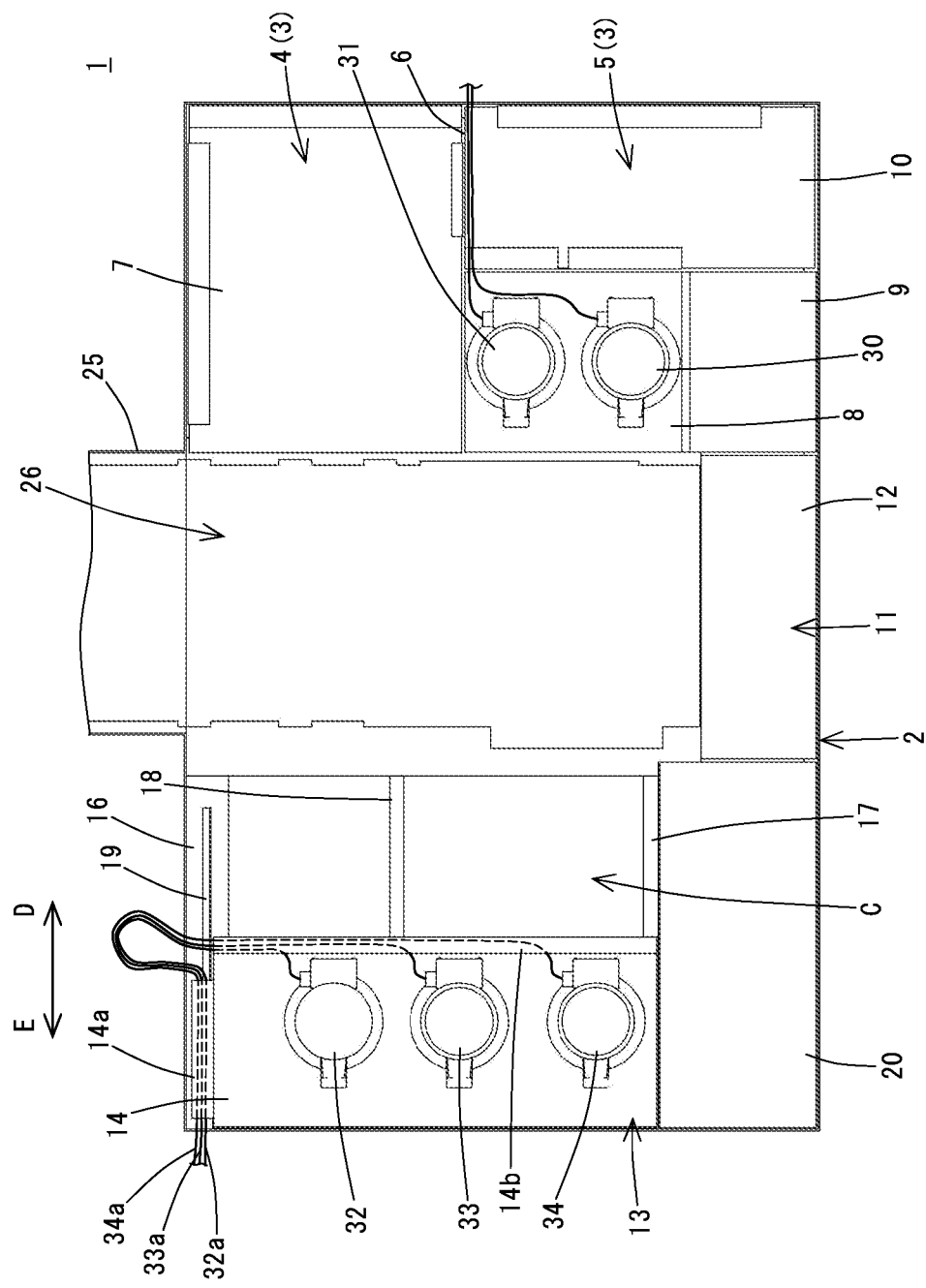
FIG. 2 is a plan view of the coolant supply device according to the embodiment, with a mounting member thereof slid.
Figure 3:
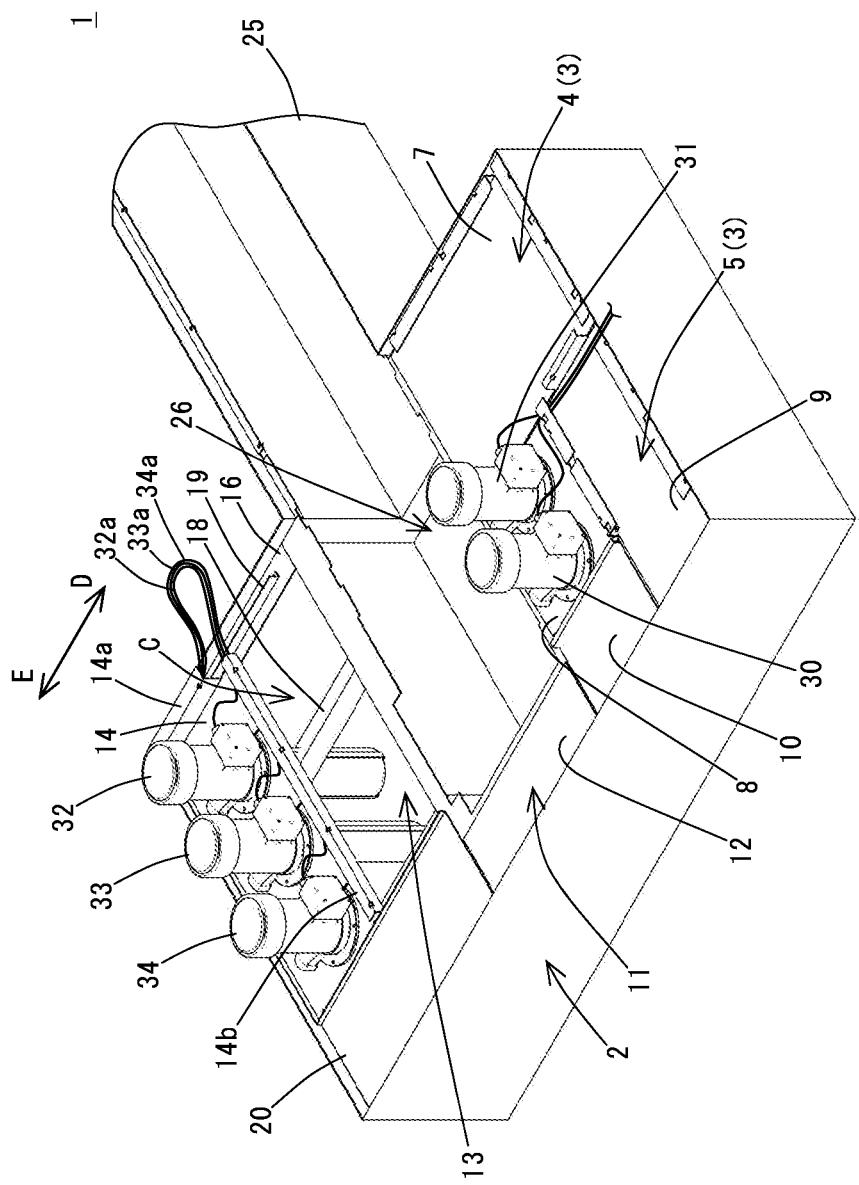
FIG. 3 is a perspective view of the coolant supply device according to the embodiment, with the mounting member thereof slid.

Hereinafter, a specific embodiment of the present disclosure will be described with reference to the drawings. A coolant supply device 1 according to this embodiment is attached to a machine tool, which is not shown in the drawings, to supply coolant C to a machining area and the like of the machine tool. As shown in FIGS. 1 to 3, the coolant supply device 1 includes a coolant tank 2 which is formed to have a substantially U-shaped overall shape in plan view and stores coolant C therein.

Specifically, the coolant tank 2 includes a first coolant reservoir 3 and a second coolant reservoir 13 each having a rectangular shape in plan view and arranged in parallel with a predetermined space therebetween, as well as a communicating part 11 arranged between ends (ends illustrated on the lower side in FIGS. 1 and 2) of the first coolant reservoir 3 and second coolant reservoir 13 and having one end connected to a sidewall of the first coolant reservoir 3 and another end connected to a sidewall of the second coolant reservoir 13 to allow the first coolant reservoir 3 and the second coolant reservoir 13 to communicate with each other. Further, the first coolant reservoir 3 is liquid-tightly divided into two reservoirs by a divider 6, the upper reservoir in FIGS. 1 and 2 being a highly clean reservoir 4 and the lower reservoir in FIGS. 1 and 2 being a return reservoir 5.

The highly clean reservoir 4 has a first pump (not shown) disposed therein, and the return reservoir 5 has a second pump 30 and a third pump 31 disposed therein near a sidewall thereof located on the second coolant reservoir 13 side. Further, the second coolant reservoir 13 has a fourth pump 32, a fifth pump 33, and a sixth pump 34 disposed therein near a sidewall thereof located on the first coolant reservoir 3 side.

The first pump (not shown) pumps up coolant C from the highly clean reservoir 4 and supplies the pumped-up coolant C to a circulating path formed in a spindle of the machine tool. The second pump 30 pumps up coolant C from the return reservoir 5 and supplies the pumped-up coolant C to agitating nozzles (not shown) provided in the return reservoir 5, the communicating part 11, and the second coolant 13. The third pump 31 pumps up coolant C from the return reservoir 5 and supplies the pumped-up coolant C to a destination above the machining area of the machine tool to discharge the coolant C into the machining area. Note that the coolant C in the return reservoir 5, the communicating part 11, and the second coolant reservoir 13 is agitated by coolant C discharged from the agitating nozzles (not shown) provided therein.

The fourth pump 32, the fifth pump 33, and the sixth pump 34 each pump up coolant C from the second coolant reservoir 13, the fourth pump 32 supplies the pumped-up coolant C to a filter device, which is not shown in the drawings, the fifth pump 33 supplies the pumped-up coolant C to a destination near the spindle of the machine tool to discharge the coolant C into the machining area, and the sixth pump 34 supplies the pumped-up coolant C to a base of the machine tool.

A space 26 is formed between the first coolant reservoir 3 and the second coolant reservoir 13 of the coolant tank 2, the space 26 communicating with a housing-shaped connecting part 25 disposed below the machining area of the machine tool. Further, the connecting part 25 and the space 26 have a chip conveyor (not shown) disposed therein, the chip conveyor collecting the coolant C supplied to the machining area of the machine tool, with foreign substances such as chips and sludge contained in the coolant C.

The chip conveyor has incorporated therein a drum-shaped filter (drum filter) (not shown). When coolant C flows into the drum filter, the coolant C is filtered and thereby foreign substances of a certain size are separated and removed from the coolant C. The internal space of the drum filter liquid-tightly communicates with the coolant tank 2 through an opening (not shown) formed in the sidewall of the return reservoir 5 located on the second coolant reservoir 13 side. Accordingly, the coolant C supplied to the machining area of the machine tool is collected in the chip conveyor, and filtered by the drum filter, after which the coolant C is returned to the return reservoir 5.

The coolant C supplied to the circulating path of the spindle by the first pump (not shown) and the coolant C supplied to the base of the machine tool by the sixth pump 34 are returned to the return reservoir 5 through separate flow paths. Further, the coolant C pumped up by the sixth pump 34 is used also for so-called backwash for unclogging the drum filter. Further, the coolant C pumped up by the fourth pump 32 is, as described above, supplied to the not-shown filter device, and highly purged by the filter device, after which the coolant C is supplied to the highly clean reservoir 4.

The first pump (not shown) is mounted to a mounting plate 7 which closes an opening of the highly clean reservoir 4, and the second pump 30 and the third pump 31 are mounted to a mounting plate 8 which is arranged to close a part of an opening of the return reservoir 5. Further, the remaining of the opening of the return reservoir 5 is closed by lid bodies 9 and 10, and an opening of the communicating part 11 is closed by a lid body 12.

The fourth pump 32, the fifth pump 33, and the sixth pump 34 are mounted to a mounting plate 14 which is arranged to close a part of an opening of the second coolant reservoir 13. The mounting plate 14 is supported by support members 16, 17 and a support frame 18 such that it is slidable in directions indicated by arrows D, E in the drawings, the support members 16, 17 and the support frame 18 being provided on the second coolant reservoir 13 along the arrow-D and arrow-E directions. The support members 16, 17 support side edges of ends of the mounting plate 14 in a direction perpendicular to the arrow-D and arrow-E directions. The support frame 18 is disposed between the support members 16, 17 to support an intermediate portion of the mounting plate 14.

Further, in a state where the mounting plate 14 is positioned on the arrow-D side, the arrow-E side of the opening of the second coolant reservoir 13 that is adjacent to the mounting plate 14 is closed by a lid body 15, and a part of the opening of the second coolant reservoir 13 adjacent to the mounting plate 14 and to the lid body 15, which is located below them in FIG. 1, is also closed by a lid body 20.

Note that the mounting plates 7 and 8 and the lid bodies 9 and 10 are detachably attached to the first coolant reservoir 3, the lid body 12 is detachably attached to the communicating part 11, and the lid bodies 15 and 20 are detachably attached to the second coolant reservoir 13.

As shown in FIG. 3, the mounting plate 14 has a cover portion 14a formed on a side edge thereof located on the support member 16 side, the cover portion 14a having a shape which erects from the side edge and is folded outward. The mounting plate 14 further has a cover portion 14b formed on a side edge thereof located on the arrow-D side, the cover portion 14b having a shape which erects from the side edge and is folded inward. Further, a containing space is formed between the outward-folded portion of the cover portion 14a and the support member 16, and a containing space is also formed between the inward-folded portion of the cover portion 14b and an inner top surface of the mounting plate 14.

Similarly, the lid body 15 has a cover portion 15a formed on a side edge thereof located on the support member 16 side, the cover portion 15a having a shape which erects from the side edge and is folded outward, and a containing space is formed between the outward-folded portion of the cover portion 15a and the support member 16.

In the containing spaces formed by the cover portions 14b and 14a and the cover portion 15a, cables 32a, 33a, 34a which are connected to the fourth pump 32, the fifth pump 33, and the sixth pump 34 to supply electric power to them are disposed.

As shown in FIG. 4, the support member 16 has a guide member 19 provided thereon, the guide member 19 extending along the side edges of the mounting plate 14 and lid body 15 and having an L-shaped cross section. Further, the lid body 20 has a shape such that a side edge thereof located on the mounting plate 14 and lid body 15 side erects. Accordingly, as shown in FIG. 3, movement of the mounting plate 14 in the arrow-D and arrow-E directions is guided by the guide member 19 and the side edge of the lid body 20.

In the coolant supply device 1 according to this embodiment having the above-described configuration, as described above, coolant C in the second coolant reservoir 13 is pumped up by the fourth pump 32, the fifth pump 33, and the sixth pump 34, the pumped-up coolant C is supplied to the above-mentioned destinations, and the supplied coolant C is returned to the return reservoir 5. Thus, this circulation of coolant C forms a basic flow of coolant C that flows from the return reservoir 5 into the second coolant reservoir 13 through the communicating part 11.

Specifically, the coolant C from the machining area of the machine tool is returned to the return reservoir 5 via the chip conveyor. Further, the coolant C supplied to the circulating path of the spindle by the first pump (not shown) is returned to the return reservoir 5 through an appropriate flow path, and the coolant C supplied to the base of the machine tool by the sixth pump 34 is also returned to the return reservoir 5 through an appropriate flow path. In the return reservoir 5, such coolant C produces a liquid flow which flows toward the communicating part 11, and therefore the coolant C flows from the return reservoir 5 into the second coolant reservoir 13 through the communicating part 11.

Further, in the second coolant reservoir 13, coolant C is pumped up by the fourth pump 32, the fifth pump 33, and the sixth pump 34.

Furthermore, the coolant C in the return reservoir 5, the communicating part 11, and the second coolant reservoir 13 is agitated by coolant C discharged from the agitating nozzles (not shown) provided therein. Therefore, even if foreign substances such as chips and sludge are mixed in with the coolant C, this agitating action prevents deposition and accumulation of the foreign substances in the return reservoir 5, the communicating part 11, and the second coolant reservoir 13.

However, the capacity of the second coolant reservoir 13 is larger than those of the return reservoir 5 and communicating part 11; therefore, it is not possible to completely prevent deposition and accumulation of foreign substances in the second coolant reservoir 13, and a long-time operation will cause foreign substances to be deposited and accumulated in the second coolant reservoir 13. Therefore, it is necessary to clean the inside of the second coolant reservoir 13 regularly. When cleaning the inside of the second coolant reservoir 13, first, the first pump (not shown), the second pump 30, the third pump 31, the fourth pump 32, the fifth pump 33, and the sixth pump 34 are stopped. Subsequently, the lid bodies 15 and 20 are detached from the second coolant reservoir 13 to expose a part of the opening of the second coolant reservoir 13. Through the exposed part, foreign substances deposited and accumulated in the second coolant reservoir 13 are removed.

Thereafter, the mounting plate 14 is moved in the arrow-E direction to expose the part closed by the mounting plate 14, and, through this exposed part, foreign substances deposited and accumulated in the second coolant reservoir 13 are removed (see FIGS. 2 and 3). After cleaning the entire area of the inside of the second coolant reservoir 13 in the above-described manner, the mounting plate 14 is moved in the arrow-D direction and thereby returned to the original position, and then the lid bodies 15 and 20 are attached to the second coolant reservoir 13. Thereafter, the first pump (not shown), the second pump 30, the third pump 31, the fourth pump 32, the fifth pump 33, and the sixth pump 34 are restarted. In FIGS. 2 and 3, for saving time required for illustration, the state where the lid body 20 is not removed is illustrated. Note that whether the inside of the second coolant reservoir 13 is cleaned in the state where the lid body 20 is removed or in the state where the lid body 20 is not removed can be freely determined; the determination can be made as appropriate.

As described above, in the coolant supply device 1 according to this embodiment, the inside of the second coolant reservoir 13 can be cleaned without removing the fourth pump 32, the fifth pump 33, the sixth pump 34, wires accompanying them, and the like. Therefore, such a cleaning operation (maintenance operation) can be performed in a short time, which suppresses decrease in availability of the machine tool caused by the cleaning operation.

Further, in the coolant supply device 1 according to this embodiment, since the openings of the first coolant reservoir 3, communicating part 11, and second coolant reservoir 13 are closed by the mounting plates 7, 8, 14 and the lid bodies 9, 10, 12, 15, 20, it is possible to prevent foreign substances entering the first coolant reservoir 3, the communicating part 11, and the second coolant reservoir 13 from above and it is possible to prevent the coolant C in the first coolant reservoir 3, the communicating part 11, and the second coolant reservoir 13 from flying out of them.

Furthermore, in the coolant supply device 1 according to this embodiment, since the cables 32a, 33a, 34a connected to the fourth pump 32, the fifth pump 33, and the sixth pump 34 are disposed in the containing spaces formed by the cover portions 14b, 14a and the cover portion 15a, the cables 32a, 33a, 34a can be hidden by the cover portions 14a, 14b, 15a, which allows the coolant supply device 1 to have a good appearance. Further, it is possible to prevent the cables 32a, 33a, 34a from hindering the sliding the mounting plate 14.

The foregoing has described the coolant supply device 1 that is implemented in accordance with one embodiment of the present disclosure. However, the present disclosure is not limited thereto and can be implemented in other modes.

For example, although the above embodiment has the configuration in which the mounting plate 14 is slidable, the present disclosure is not limited to such a configuration. The mounting plate 8 to which the second pump 30 and the third pump 31 are mounted may be slidably provided. In such a configuration, the inside of the return reservoir 5 can be cleaned without removing the second pump 30, the third pump 31, wires accompanying them, and the like.

Further, the mounting plate 8 and the lid body 10 may have cover portions provided thereon which have the same structure as that of the cover portion 14a and/or that of the cover portion 14b, so that cables connected to the second pump 30 and the third pump 31 are disposed in containing spaces formed by the cover portions.

Further, the present disclosure does not necessarily require all the first pump (not shown) through the sixth pump 34; the pumps can be provided as appropriate in accordance with the purpose of supplying coolant.

What is claimed is:

1. A coolant supply device attached to a machine tool to supply coolant to a machining area and other areas of a machine tool, the coolant supply device comprising:
   a coolant tank storing coolant therein;
   a mounting plate covering a part of an upper opening of the coolant tank; and
   a supply pump mounted to the mounting plate and configured to pump up the coolant stored in the coolant tank and supply the pumped-up coolant to the machine tool,
   the coolant supply device being configured such that the coolant supplied to the machine tool by the supply pump is returned to the coolant tank through a predetermined flow path,
   the mounting plate being supported by a support member such that the mounting plate is slidable to a non-covered side of the upper opening of the coolant tank,
   the coolant supply device further comprising a lid body arranged to cover the upper opening of the coolant tank adjacently to the mounting plate and to be attachable to and detachable from the coolant tank,
   the upper opening of the coolant tank being configured to be closable by the mounting plate and the lid body,
   when the lid body is detached from the coolant tank, the mounting plate with the supply pump mounted thereto being slidable to a side previously covered by the lid body.

2. The coolant supply device of claim 1, wherein:
   a cable connected to the supply pump is disposed along a sliding direction of the mounting plate on one side end side of the mounting plate; and
   the mounting plate has a cover portion for covering the cable.

* * * * *